United States Patent
Hagihara et al.

(10) Patent No.: US 6,175,512 B1
(45) Date of Patent: Jan. 16, 2001

(54) DEVICE FOR OPERATING INVERTER AND POWER SYSTEM

(75) Inventors: Ryuzo Hagihara, Kadoma; Kenji Uchihashi, Amagasaki; Takeo Ishida, Hirakata, all of (JP)

(73) Assignee: Sanyo Electric Co., Ltd., Osaka (JP)

( * ) Notice: Under 35 U.S.C. 154(b), the term of this patent shall be extended for 0 days.

(21) Appl. No.: 09/313,969

(22) Filed: May 19, 1999

(30) Foreign Application Priority Data

May 22, 1998 (JP) .................................................. 10-141465

(51) Int. Cl.[7] ...................................................... H02M 3/00
(52) U.S. Cl. ............................................. 363/71; 323/906
(58) Field of Search .......................... 363/65, 71; 323/906

(56) References Cited

U.S. PATENT DOCUMENTS

| 4,636,931 | * | 1/1987 | Takahashi et al. | 363/71 |
| 5,682,303 | * | 10/1997 | Goad | 363/71 |
| 5,896,281 | * | 4/1999 | Bingley | 363/71 |

OTHER PUBLICATIONS

Abstract of Japanese Patent Publication No. 06165513, dated Jun. 10, 1994.

* cited by examiner

Primary Examiner—Jessica Han
(74) Attorney, Agent, or Firm—Arent Fox Kintner Plotkin & Kahn, PLLC

(57) ABSTRACT

A device for operating inverters according to the present invention can operate a plurality of inverters for converting DC output from a DC source such as a solar cell to AC output efficiently without relying on a particular inverter. The plurality of inverters are connected to the DC source through switches. DC output from a DC source is measured by a measuring device to determine the number of inverters to be operated on a basis of the output result from the measuring device. The inverters to be added or cut off are determined among the plurality of inverters at random on a basis of the random number and switches of the determined inverters are turned ON or OFF in order to select inverters to be operated.

16 Claims, 5 Drawing Sheets

DEVICE FOR OPERATING INVERTER AND POWER SYSTEM

BACKGROUND OF THE INVENTION

1. Field of the Invention

This invention is related to a power system which converts DC output from a DC power source such as a solar cell and a fuel cell to AC output by an inverter and supplies to a load, and is intended for an efficient operation of the inverter.

2. Description of Prior Art

A solar power generating system which uses solar cells becomes popular as a clean power system.

FIG. 5 is a schematic view illustrating a conventional solar power generating system for domestic use. DC sources 101 comprising of a plurality of solar cells are placed on a house roof. DC output from the plurality of DC sources is accumulated and flowed into a connection box 102. The DC output from the connection box 102 is converted to AC output by an inverter 103, and is supplied to a load 105 as home electric appliance through a panelboard 104. Electricity can be also supplied to the loads 105 from a commercial power supply 106. When electricity runs short, for example at night, electric power is supplied from the commercial power supply 106.

In the meanwhile, efficiency of an inverter dips sharply at a time of low output. To solve the problem, Patent Abstracts of Japan, publication number 06165513, for example, provides a method for operating a plurality of inverters in parallel and determining how many inverters should be operated by judging a total output current of inverters.

SUMMARY OF THE INVENTION

The conventional procedure determines merely how many inverters should be operated on a basis of output current and does not take into consideration about which inverters should be operated. Accordingly, particular inverters work at a time of low output and the others work only at a time when output is increased. The particular inverters are operated longer than the other, resulting in shorter service life of that particular inverters than the others.

In addition, in a case where the above-mentioned particular inverters among the plurality of inverters become out of work, the total system can not work.

The present invention was made to overcome this drawback.

A device for operating inverters in the present invention comprises a plurality of inverters connected in parallel to a DC source, means for determining the number of inverters to be operated on a basis of AC output from the plurality of inverters or DC output from the DC source, and selection means for selecting the determined number of inverters to be operated among the plurality of inverters at random.

The selection means includes a random number generation unit for calculating data on an inverter to be selected on a basis of information from the random number generation unit.

The inverters are connected to the DC source through switches. The selection means controls the switches to turn ON or OFF.

As above described, inverters to be operated can be selected at random from the plurality of inverters by selecting an inverter to be added or cut off among the plurality of inverters on a basis of the random number, preventing a particular inverter from working for a long period of time.

A device for operating inverters in the present invention comprises a plurality of inverters connected in parallel to a DC source, means for determining the number of inverters to be operated on a basis of AC output from the plurality of inverters or DC output from the DC source, and selection means for selecting the determined number of inverters to be operated with less operating time among the plurality of inverters.

The selection means includes storage means for storing data on the inverters' operating time and selects inverters to be operated by referring data in the storage means.

The inverters are connected to the DC source through switches. The selection means controls the switches to turn ON or OFF.

Inverters to be operated with less operating time are selected from the plurality of inverters. By selecting in such a manner, the determined number of inverters with less operating time are selected on a basis of operating time of each inverter among the plurality of inverters. Therefore, the operating time of each inverter becomes approximately equal, resulting in the prolonged service life of the power system.

A device for operating inverters in the present invention comprises a plurality of inverters connected in parallel to a DC source, means for determining the number of inverters to be operated on a basis of AC output from the plurality of inverters or DC output from the DC source, and selection means for selecting the determined number of inverters to be operated with less output amount among the plurality of inverters.

The selection means includes storage means for storing data on the inverters' output amount and selects inverters to be operated by referring data in the storage means.

The inverters are connected to the DC source through switches. The selection means controls the switches to turn ON or OFF.

Inverters to be operated with less output amount are selected from the plurality of inverters. By selecting in such a manner, the determined number of inverters with less output amount are selected among the plurality of inverters. Therefore, the frequency of operating each inverter becomes approximately equal, resulting in the prolonged service life of the power system.

A power system in the present invention having a DC source, a plurality of inverters connected in parallel to a DC source comprises means for determining the number of inverters to be operated on a basis of AC output from the plurality of inverters or DC output from the DC source, and selection means for selecting the determined number of inverters to be operated among the plurality of inverters at random, and DC output from the DC source is converted to AC output to yield the AC output.

As above described, the determined number of inverters to be operated can be selected at random from the plurality of inverters. It can prevent a particular inverter from working for a long period of time and achieve a prolonged service life of the power system.

A power system in the present invention having a DC source and a plurality of inverters connected in parallel to the DC source comprises means for determining the number of inverters to be operated on a basis of AC output from the plurality of inverters or DC output from the DC source, and selection means for selecting the determined number of inverters to be operated with less operating time among the plurality of inverters, and DC output from the DC source is converted to AC output to yield the AC output.

As above described, the determined number of inverters to be operated with less operating time can be selected among the plurality of inverters. Therefore, operating time of each inverter becomes approximately equal, resulting in a prolonged service life of the power system.

A power system in the present invention having a DC source and a plurality of inverters connected in parallel to a DC source comprises means for determining the number of inverters to be operated on a basis of AC output from the plurality of inverters or DC output from the DC source, and selection means for selecting the determined number of inverters to be operated with less output amount among the plurality of inverters, and DC output from the DC source is converted to AC output to yield the AC output.

As above described, the determined number of inverters to be operated with less output amount can be selected from the plurality of inverters. Frequency of operating each inverter becomes approximately equal, resulting a prolonged service life of the power system.

In addition, a power system according to the present invention is provided with failure judging means for judging a failure in each of the plurality of inverters. The determined number of inverters are selected from the plurality of inverters on a basis of a signal from the failure judging means. The power system according to the present invention is also provided with an alarm for giving the output result from the failure judging means.

In the above composition, the system can be operated without using an failure inverter.

The foregoing and other objects, features, aspects and advantages of the present invention will become more apparent from the following detailed description of the present invention.

DESCRIPTION OF THE PREFERRED EMBODIMENTS (A first embodiment)

Figure 1:
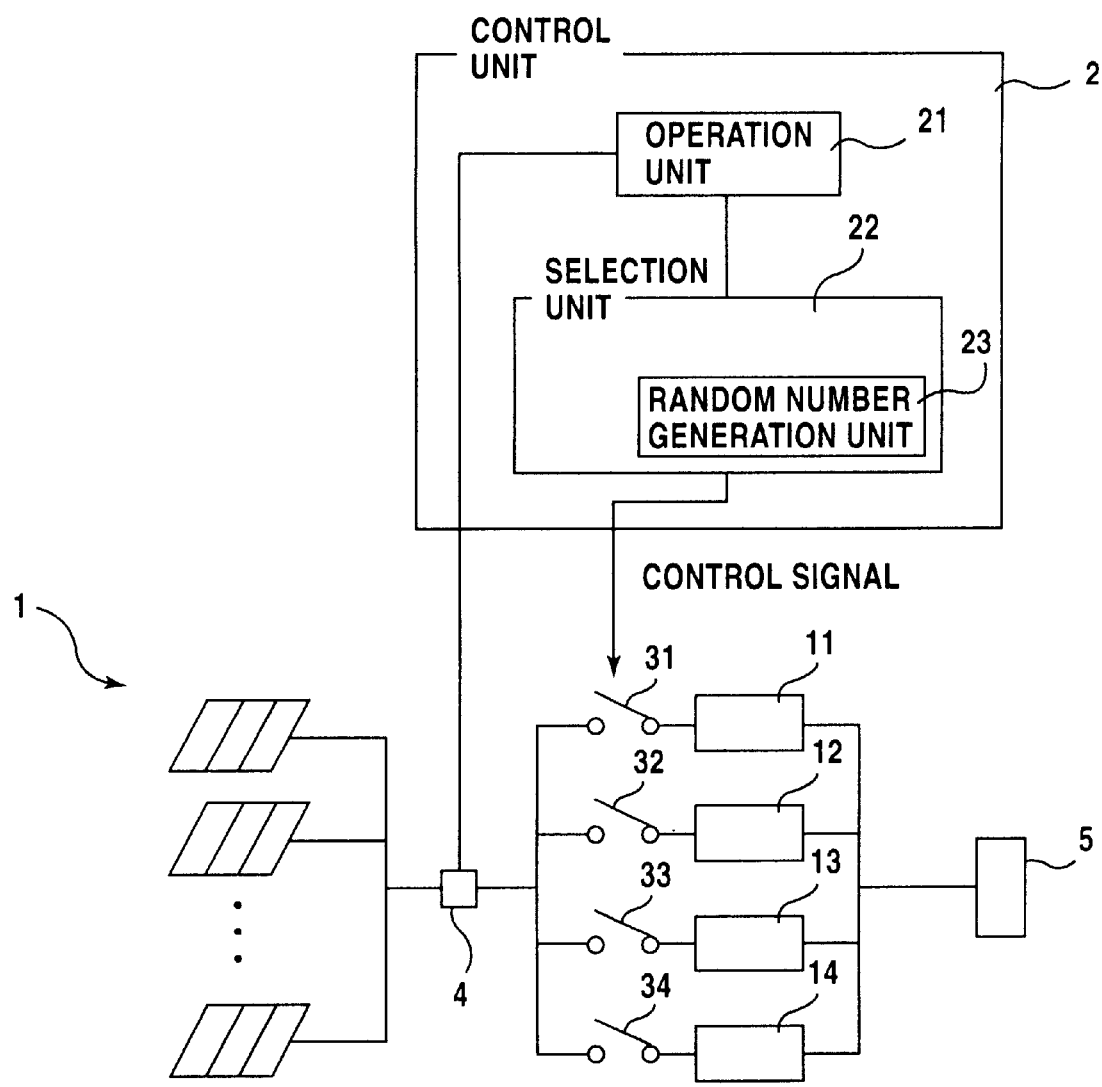
FIG. 1 is a block diagram illustrating a power system according to a first embodiment of the present invention.

A power system according to a first embodiment of the present invention will be described by referring to a block diagram as shown in FIG. 1. In this description, explanation will be made about a power system for 2 kW.

As illustrated in FIG. 1, a power system comprises a DC source 1 including a plurality of solar cell modules, four units of inverters 11–14 for rated output of 500 W which are connected in parallel with the DC source 1, and a control unit 2 for controlling each inverter. Selector switches 31–34 which respectively form pairs with inverters 11–14 are provided. A selector switch corresponding to the one of the inverters selected by the control unit turns ON to operate the inverter. AC output from the inverter is supplied to a load 5. The system may be connected with a commercial power supply (not illustrated). A measuring device 4 measures DC output from the DC source 1, and a signal from the measuring device 4 is sent to the control unit 2.

The control unit 2 comprises an operation unit 21 for determining how many inverters should be operated on a basis of a signal from the measuring device 4, a selection unit 22 for selecting the determined number of inverters to be operated among the four inverters 11–14. The selection unit 22 includes a random number generation unit 23, and selects inverters to be operated at random among the plurality of inverters on a basis of an output result from the random number generation unit 23. The control unit 2 sends a control signal to a selector switch corresponding to an inverter selected by the control unit 23 in order to operate the equivalent inverter by turning the selector switch ON.

Figure 2:
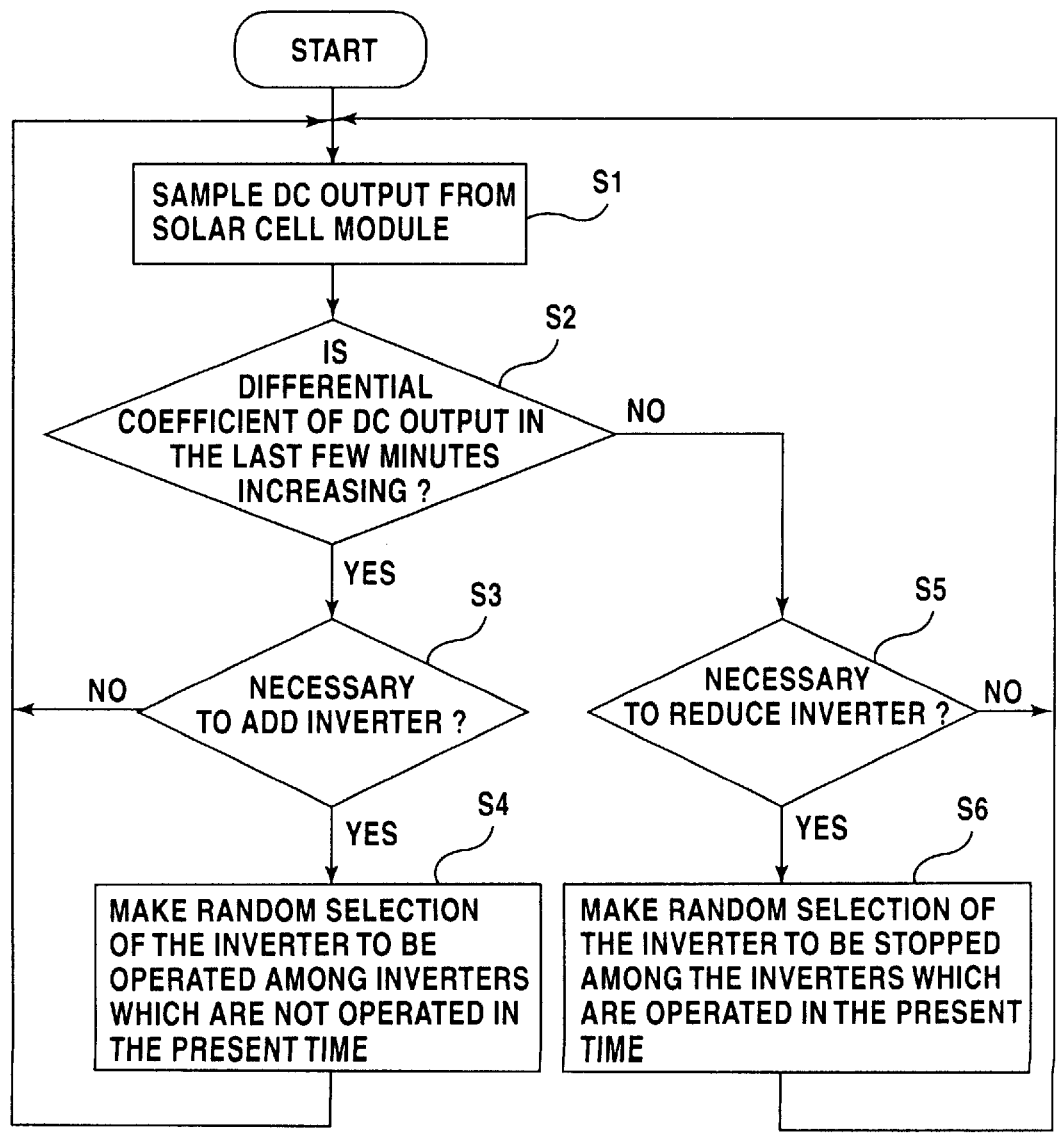
FIG. 2 is a flow chart illustrating control routine of an inverter according to the first embodiment.

A procedure of controlling inverters in the control unit 2 is illustrated in the flow chart as FIG. 2.

A measuring device 4 measures DC output from a DC source 1. The DC output from the DC source 1 which is fed from the measuring device 4 is sampled with sampling frequency such as a few msec to tens msec (Step 1).

Then, the control unit obtains a differential coefficient for DC output in the last few minutes and judges whether the differential coefficient is increasing or not (Step 2). By employing a differential coefficient, influence of momentary changes of output power caused by weather change resulting from a shade of a cloud and a fitful wind can be prevented.

When the differential coefficient is increasing (YES in Step 2), the control unit judges whether it is necessary to add an inverter to be operated (Step 3). In specific, the control unit calculates a value of DC output at a next sampling in view of the differential coefficient, and judges adding an inverter to be operated is necessary when the calculated value exceeds the range of DC output which can be covered by the presently running inverters.

For example, two inverters are running at 950 W of output power. When a next sampling output power is expected 1050 W in view of the differential coefficient, the control unit judges that one inverter needs to be added since 1,050 W is beyond the capacity of the presently running two inverters for 500 W. When a next sampling output power is expected 980 W, the control unit judges that no inverter needs to be added since the current two inverters are sufficient.

When it is necessary to add inverters to be operated (YES in Step 3), the control unit 2 makes a random selection of inverters to be operated from the inverters which are not running at present (Step 4). The control unit 2 sends a control signal to the selector switches corresponding to the selected inverter and turns the selector switch ON to operate the corresponding inverter.

This series of procedures forms a routine. After finishing these procedures, the routine is repeated from Step 1. When it is not necessary to add an inverter to be operated (NO in Step 3), this routine is also repeated from Step 1.

When the differential coefficient of DC output in the last few minutes is not increasing (NO in Step 2), the control unit judges whether it is necessary to reduce the inverters to be operated (Step 5). In judging it, as in Step 3, the control unit calculates a value of DC output at a next sampling in view of the differential coefficient, and judges reducing an inverter to be operated is necessary when the calculated value is below the range of DC output which can be covered by the less number of inverters than presently running.

When it is necessary to reduce an inverter to be operated (YES in Step 5), the control unit 2 makes a random selection of an inverter to be cut off from the inverters which are running at present (Step 6). The control unit 2 sends a control signal to the selector switch corresponding to the selected inverter and turn the selector switch OFF to stop operation of the corresponding inverter.

This series of procedures forms a routine. After finishing the procedures, the routine is repeated from Step 1. When it is not necessary to reduce an inverter to be operated (NO in Step 5), this routine is also repeated from Step 1.

In this embodiment, the control unit makes a random selection of an inverter to be added or cut off among the plurality of inverters to make a random selection of the determined number of inverters determined by the operation unit 21 among the plurality of inverters. Therefore, no particular inverter works longer than others, resulting in prolonged service life of a power system.

In the above description, the measuring device measures DC output from the DC source I to determine the number of inverters to be operated. In other case, the control unit may measure AC output from the inverters 11–14, instead of the DC output, to determine the number of inverters to be operated.

Besides, in a case that one or more than one inverters become out of work, it is desirable to remove those units from the selection list. To achieve this, a failure judgment unit for judging a failure in the plurality of inverters is provided to feed a signal from the failure judgment unit to the control unit 2. It is preferred to select the determined number of inverters at random among the inverters except a failure inverter in accordance with a signal from the failure judgment unit.

In addition, it is desirable to provide means for giving an alarm of a failure signal from the failure judgment unit by sounds or display, etc.

(A second embodiment)

Figure 3:
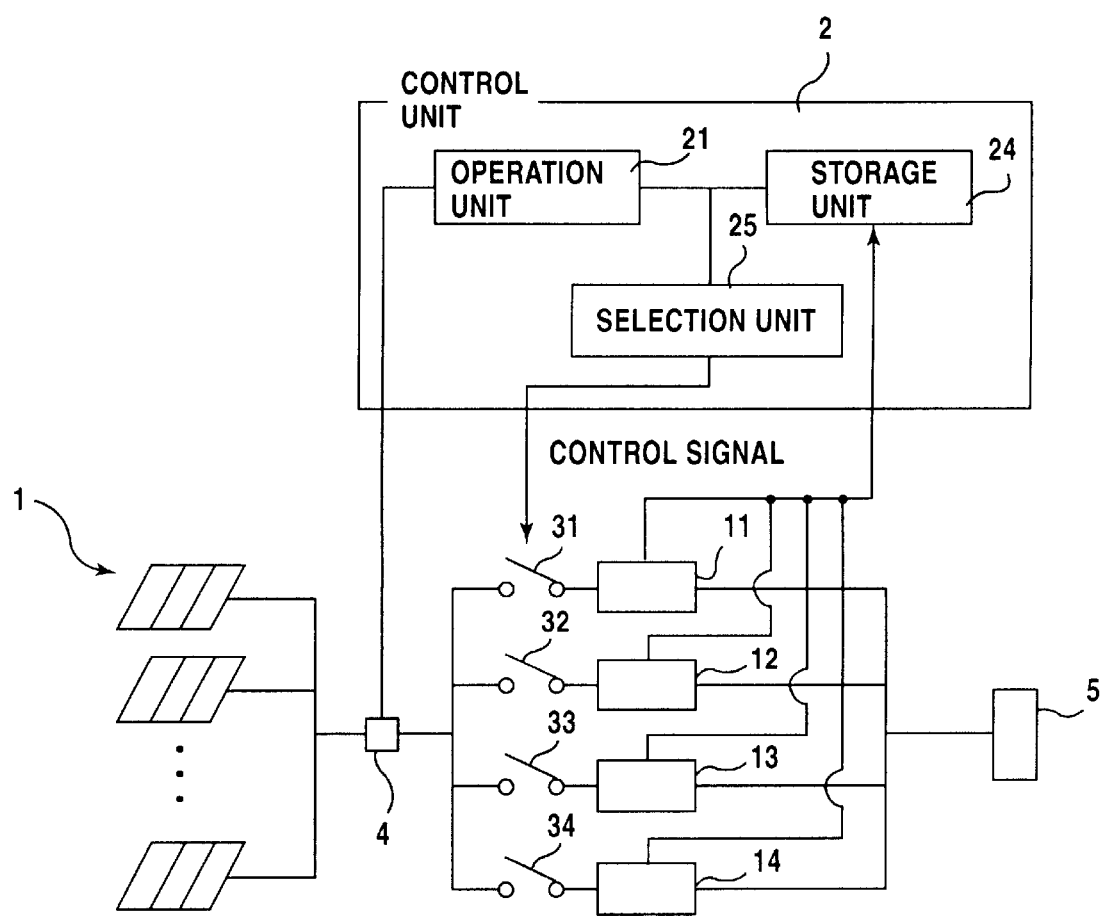
FIG. 3 is a block diagram illustrating a power system according to a second embodiment of the present invention.

A power system according to a second embodiment of the present invention will be described by referring to a block diagram as shown in FIG. 3.

It should be noted that the same reference numerals shown in FIG. 1 will be employed as those for denoting the same elements.

A power system in the second embodiment is different from the first embodiment in the following points. The power system in the second embodiment has a control unit 2 provided with a storage unit 24 for storing each operating time of a plurality of inverters 11–14. The number of inverters to be operated is determined by an operation unit 21, and a selection unit 25 selects the determined number of inverters with less operating time on a basis of data stored in the storage unit 24. The control unit 2 controls operating time of the running inverters 11–14 and makes the storage unit 24 store the operating time as the data.

Figure 4:
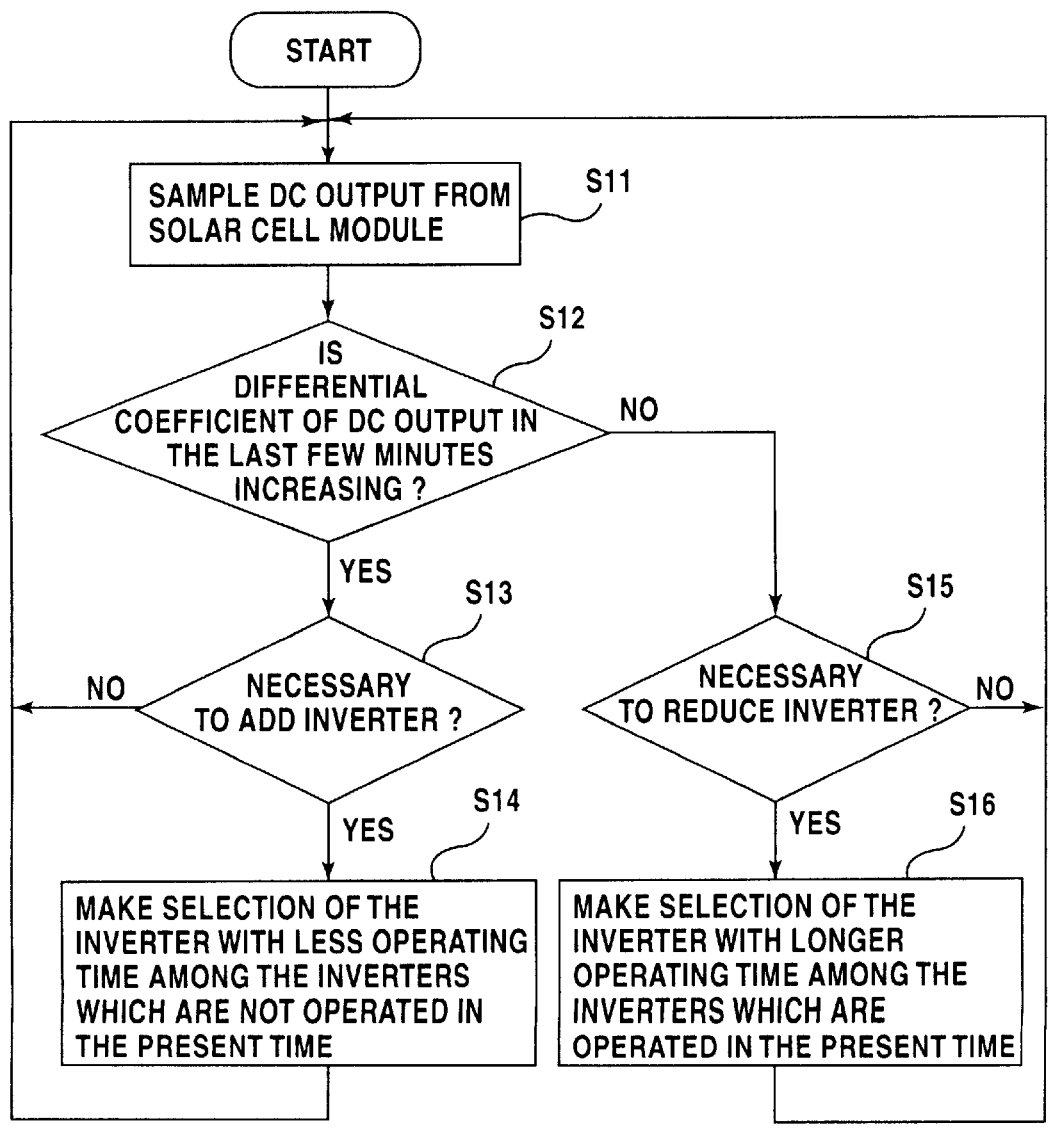
FIG. 4 is a flow chart illustrating control routine of an inverter according to the second embodiment.
Figure 5:
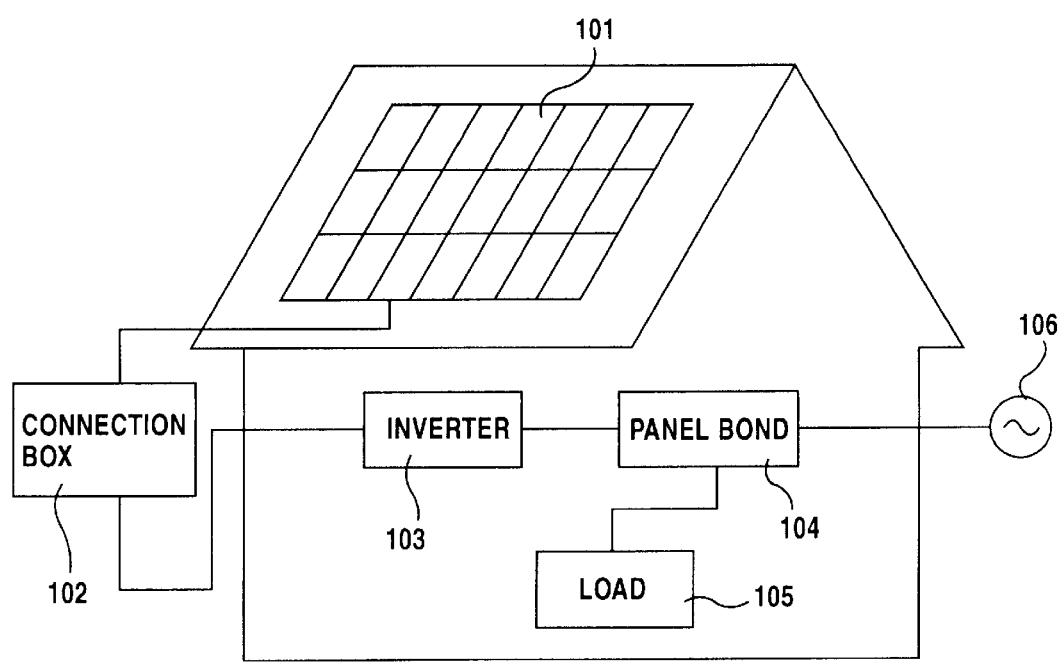
FIG. 5 is a view illustrating a system composition of a conventional solar power generating system.

A procedure of controlling inverters in the control unit 2 is illustrated in a flow chart as FIG. 4.

A measuring device 4 measures DC output from the DC source 1. The DC output from the DC source 1 which is fed from the measuring device 4 is sampled with sampling frequency such as a few msec to tens msec (Step 11).

Then, the control unit 2 obtains a differential coefficient of DC output in the last few minutes and judges whether the differential coefficient is increasing or not (Step 12). By employing a differential coefficient, influence of momentary changes of output power caused by weather change resulting from a shade of a cloud and a fitful wind can be prevented.

When the differential coefficient is increasing (YES in Step 12), the control unit 2 judges whether it is necessary to add an inverter to be operated (Step 13). As in the first embodiment, the control unit calculates DC output at a next sampling in view of the differential coefficient, and judges adding an inverter to be operated is necessary when the calculated value exceeds the range of DC output which can be covered by the presently running inverters.

When it is necessary to add inverters to be operated (YES in Step 13), the control unit 2 makes a selection of inverters to be run from the inverters which have worked for less time than the others by referring the data from the storage unit 24 (Step 14). The control unit 2 sends a control signal to the selector switch corresponding to the selected inverter and turns the selector switch ON to operate the corresponding inverter, This series of procedures forms a routine. After finishing these procedures, the routine is repeated from Step 11. When it is not necessary to add an inverter to be operated (NO in Step 13), this routine is also repeated from Step 11.

When the differential coefficient of DC output in the last few minutes is not increasing (NO in Step 12), the control unit 2 judges whether it is necessary to reduce the inverters to be operated (Step 15). In judging it, as in the first embodiment, the control unit 2 calculates DC output at a next sampling in view of the differential coefficient, and judges reducing an inverter to be operated is necessary when the calculated value is below the range of DC output which can be covered by the less number of inverters than presently running.

When it is necessary to reduce an inverter to be operated (YES in Step 15), the control unit 2 makes a selection of an inverter to be cut off from the presently running inverters with longer operation time by referring the data in the storage unit 24 (Step 16). The control unit 2 sends a control signal to the selector switches corresponding to the selected inverter and turns the selector switch OFF to stop operation of the inverter.

This series of procedures forms a routine. After finishing the procedures, the routine is repeated from Step 11. When it is not necessary to reduce an inverter to be operated (NO in Step 15), this routine is also repeated from Step 11.

As previously explained, in this embodiment, the selection unit 25 selects an inverter to be operated with less operating time among a plurality of inverters and selects an inverter to be cut off with longer operating time from the presently operating inverters. By such a selection, the determined number of inverters determined by the operation unit 21 can be selected from a plurality of inverters with less operation time. Therefore, operating time of each inverter become approximately equal, resulting in prolonged service life of the power system.

In the above description, the measuring device 4 measures DC output from the DC source 1 to determine the number of inverters to be operated. In other case, the control unit may measure AC output from the inverters 11–14, instead of the DC output, to determine the number of inverters to be operated.

In the above description, the determined number of inverters are selected by referring the data on operating time of each inverter stored in the storing portion 24. In order to achieve the same effect, it may also be possible that the storing portion 24 stores the information on an amount of power output from each inverter instead of its operating time in order to select an inverter with less output amount to be operated on the basis of a power output amount.

Besides, in a case where one or more than one inverters become out of work, it is desirable to remove those units from a selection list. To achieve this, a failure judgment unit for judging a failure in the plurality of inverters is preferably provided to feed a signal to the control unit 2. It is preferred to select the determined number of inverters among the inverters with less operation time or less output amount except a failure inverter in accordance with a signal from the failure judgment unit.

In addition, it is desirable to provide means for giving an alarm of a failure signal from the failure judgment unit by sounds or display, etc.

The present invention is applicable to power systems applied to other types of DC sources, such as a fuel cell and wind power generation, although the first and second embodiments describe a power system applied to a solar cell.

Regarding a system composition, the present invention is not limited to a system for 2 kW, but applicable to power system for 1 kW or 3 kW etc.

Besides, the present invention is applicable to any types of AC/DC inverters, not limited to a single- or three-phase type.

By operating inverters as described above, all of the inverters can be operated with approximately equal frequency without relying on a particular inverter. Therefore, it prevents the particular inverter from being out of life earlier than the others, which makes it possible to prolong the service life of the whole system.

Furthermore, the power system according to the present invention can operate each inverter with approximately equal frequency. Therefore, it is possible to provide a power system with long service life.

Although the present invention has been described and illustrated in detail, it is clearly understood that the same is by way of illustration and example only and is not be taken by way of limitation, the spirit and scope of the present invention being limited only by the terms of appended claim.

What is claimed:

1. A device for operating inverters comprising:
   a plurality of inverters connected in parallel to a DC source, means for determining the number of inverters to be operated on a basis of AC output from said plurality of inverters or DC output from said DC source, and selection means for selecting said determined number of inverters to be operated with less operating time among said plurality of inverters.

2. The device for operating inverters according to claim 1, wherein
   said selection means includes storage means for storing data on the inverters' operating time and selects inverters to be operated by referring data in the storage means.

3. The device for operating inverters according to claim 1, wherein
   said inverters are connected to the DC source through switches and said selection means controls the switches to turn ON or OFF.

4. A device for operating inverters comprising:
   a plurality of inverters connected in parallel to a DC source, means for determining the number of inverters to be operated on a basis of AC output from said plurality of inverters or DC output from said DC source, and selection means for selecting said determined number of inverters to be operated with less output amount among said plurality of inverters.

5. The device for operating inverters according to claim 4, wherein
   said selection means includes storage means for storing data on the inverters' output amount and selects inverters to be operated by referring data in the storage means.

6. The device for operating inverters according to claim 4, wherein
   said inverters are connected to the DC source through switches and said selection means controls the switches to turn ON or OFF.

7. A power system having a DC source and a plurality of inverters connected in parallel to the DC source comprising:
   means for determining the number of inverters to be operated on a basis of AC output from said plurality of inverters or DC output from said DC source, and selection means for selecting said determined number of inverters to be operated with less operating time among said plurality of inverters, and wherein
   DC output from the DC source is converted to AC output to yield the AC output.

8. The device for operating inverters according to claim 7, wherein
   said selection means includes storage means for storing data on the inverters' operating time and selects inverters to be operated by referring data in the storage means.

9. The device for operating inverters according to claim 7, wherein
   said inverters are connected to the DC source through switches and said selection means controls the switches to turn ON or OFF.

10. The device for operating inverters according to claim 7, wherein
    failure judging means for judging a failure in each of said plurality of inverters is provided and said determined number of inverters are selected from said plurality of inverters on a basis of a signal from said failure judging means.

11. The device for operating inverters according to claim 10, wherein
    an alarm for giving the output result from said failure judging means is provided.

12. A power system having a DC source and a plurality of inverters connected in parallel to the DC source comprising:
    means for determining the number of inverters to be operated on a basis of AC output from said plurality of inverters or DC output from said DC source, and selection means for selecting said determined number of inverters to be operated with less output amount among said plurality of inverters, and wherein
    DC output from the DC source is converted to AC output to yield the AC output.

13. The device for operating inverters according to claim 12, wherein
    said selection means includes storage means for storing data on the inverters' operating time and selects inverters to be operated by referring data in the storage means.

14. The device for operating inverters according to claim 12, wherein
    said inverters are connected to the DC source through switches and said selection means controls the switches to turn ON or OFF.

15. The device for operating inverters according to claim 12, wherein
    failure judging means for judging a failure in each of said plurality of inverters is provided and said determined number of inverters are selected from said plurality of inverters on a basis of a signal from said failure judging means.

16. The device for operating inverters according to claim 15, wherein
    an alarm for giving the output result from said failure judging means is provided.

* * * * *